Dec. 2, 1941.  S. SIEGEL  2,265,011
SENSITIVE DEVICE FOR MEASURING FORCES
Filed July 26, 1939
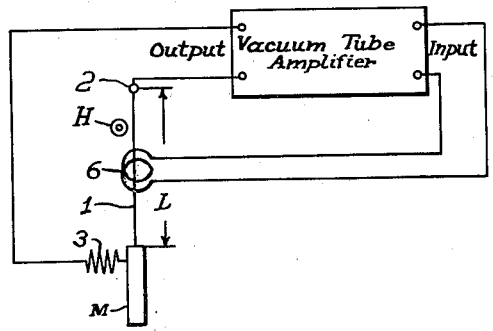
WITNESSES:
Edward Michaels
Wm. J. Ruano
INVENTOR
Sidney Siegel.
BY
Paul E. Friedemann
ATTORNEY Patented Dec. 2, 1941

2,265,011

UNITED STATES PATENT OFFICE 2,265,011

SENSITIVE DEVICE FOR MEASURING FORCES

Sidney Siegel, Pittsburgh, Pa., assignor to Westinghouse Electric & Manufacturing Company, East Pittsburgh, Pa., a corporation of Pennsylvania Application July 26, 1939, Serial No. 286,630

4 Claims. (Cl. 265—1.4)

My invention relates to a sensitive device for measuring force, which device is particularly adapted to measure small changes in the weight of a body or to measure the magnetic permeability of the particular sample of the material (or to determine whether the material is paramagnetic or diamagnetic) or for other similar uses.

In the past, great difficulties have been encountered in the attempt to measure a small change in force (gravitational or otherwise) on a mass, particular when such mass is located in a vacuum or in a chamber having an exceedingly high or low temperature. Many devices which are ordinarily suitable for measuring exceedingly small forces, or small changes of force, for example, an extremely delicate balance or scale, are obviously not applicable to measure the weight of a mass which is located in the vacuum or in a high or low temperature region.

An object of my invention is to provide a completely electrical, sensitive device for measuring a force acting on a mass which mass may be located in a vacuum or in a high or low temperature region.

Other objects and advantages will become more apparent from a study of the following specification when considered in conjunction with the accompanying drawing, in which a single figure is a showing of a device embodying the principles of my invention, which device is adapted for measuring the weight of a body.

Referring more particularly to the figure, M denotes a mass which is attached to the bottom of a wire 1, which wire is suspended from a point 2. The wire has a length indicated by L in the drawing. The wire 1 forms a part of an electrical circuit which circuit includes the output of a vacuum tube amplifier. A spring 3 may be used to complete the circuit either by being connected directly to wire 1 or to the wire 1 through the mass M. A permanent magnetic field is applied at right angles to wire 1 and is denoted by H which is intended to represent that the direction of the field is from the plane of the paper outwardly toward the reader.

The operation of the device shown in the figure which is for the determination of the gravitational force, that is, the weight of mass M is as follows. Let us assume that the oscillator (that is, the amplifier and wire 1 combination) is providing an alternating current which is flowing through wire 1. In view of the presence of the permanent magnetic field H, a magnetic force will be applied to the wire, thereby causing it to move alternately to the left and to the right depending upon the direction of current through wire 1. In other words, assume during a particular half-cycle of the alternating current wave that the current is flowing downwardly in wire 1. Then, according to the Fleming "Left-hand rule" application to motors in general, a magnetic force will be applied to wire 1 so as to move it to the left. At the next half-cycle when the current is reversed, that is when it is moving upwardly through wire 1, force will be applied, tending to move wire 1 to the right. In this manner, it will be seen that wire 1 will determine the frequency of the oscillator. When a condition of sustained vibration or resonance has been obtained, the frequency of the oscillator is noted, for this is also the natural resonance frequency of the wire. Such frequency may be measured with a quartz controlled frequency standard. The natural frequency of wire 1 may be indicated by the formula $$f_n = \frac{1}{2L}\sqrt{\frac{Mg}{p}}$$

where

L is the length of wire 1 in centimeters.
M is the mass in grams whose change or value is to be measured.
g is the acceleration of gravity, 980 cm./sec./sec.).
p is the weight per unit length of wire 1 in grams per centimeter.

It will thus be seen that since the natural resonance frequency $f_n$ of the wire may be measured and since the length L and since the value of g and the value of p are all constants for a given case, M may readily be calculated from the above equation.

Wire 1 may be made of a suitable material preferably one having a high ratio of tensile strength to density, such as tungsten. Other materials such as quartz fibers sputtered with gold would be suitable also. For a tungsten wire .001 in diameter, 5 cm. long with a weight of 40 gm. hung on it, the frequency $f_n$ equals 5000 cycles. Such frequency may be measured with a quartz controlled frequency standard to .01 cycle or a fractional accuracy of 2 parts per million. This corresponds to a change of weight of 4 parts per million or for the 40 gm. weight assumed, a change of .00016 gm.

Inasmuch as the above described device is completely electrical, mass M may be situated in any atmosphere. For example, it may be situated in a vacuum or in a furnace having a high temperature or in a refrigerated atmosphere.

Near the middle of length L of wire 1 is situated a coil 6 which is wound in the plane of the paper or drawing but does not surround the wire 1, but is merely adjacent thereto. The terminals of this coil are connected to the input terminals of the vacuum tube amplifier.

If now the wire is in any way disturbed, it will vibrate with a frequency $$f_n = \frac{1}{2L}\sqrt{\frac{Mg}{p}} \qquad (1)$$

the symbols having the same meaning as before. Since it moves in the magnetic field H, an alternating current of frequency $f_n$ will be induced in it. Since a moving wire carrying a current induces a current in properly disposed neighboring conductors, the coil 6 will have induced in it an alternating current of frequency $f_n$. This will be amplified by the vacuum tube amplifier, and the output, also of frequency $f_n$, applied to the ends of the wire. This output current through the wire in the magnetic field H produces forces which will sustain indefinitely the vibration started. We have in effect a vacuum tube oscillator whose frequency is determined not by circuit constants, but by the length, and density of the string and the tension in it.

The frequency of such an oscillator may be measured by comparison with the ordinary standards of frequency, such as a piezoelectric oscillator, or standard radio frequency emissions. If properly designed and temperature controlled, it will be possible to measure frequency differences to the order 1 part in $10^7$, or changes in the tension or density of the fiber to 2 parts in $10^7$.

While my invention has been described as being applicable in the determination of a force acting on a body for the purpose of indicating the weight thereof, it will be apparent that my invention is applicable to any other similar device where small forces are to be measured, which forces represent other characteristics. For example, inasmuch as a sustained oscillation of a wire 1 is obtained, such wire 1 may be used in the same manner as a tuning fork would be used for controlling the frequency of an oscillating circuit or the like. Since a change in the value of the mass, or the force applied thereto, causes a variation in the natural frequency of the wire, it will be readily observed that a variable frequency vibrator is thus provided which is useful for controlling the frequency of an electrical circuit such as an oscillating circuit. Furthermore my device may be used in geological surveys as a gravimeter, i. e., an instrument to measure local changes in $g$, the acceleration of gravity, due to local geological formations such as oil deposits, etc.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A force measuring device comprising, in combination, a mass which is suspended by a wire of non magnetic material having a high ratio of tensile strength to density, means for producing a magnetic field at right angles to said wire, a vacuum tube amplifier having a pair of output terminals and a pair of input terminals, said wire being connected across said output terminals, a coil located near the center of said wire, having its plane longitudinally disposed relative to said wire, said coil being connected across the input terminals of said amplifier, said wire when plucked being effective to induce a voltage in said coil and the input terminal of the amplifier which voltage has a frequency which is the same as the natural resonance frequency of said wire, said vacuum tube amplifier being effective to amplify this voltage and feed it back to said wire thereby acting, in effect, as a vacuum tube oscillator and sustaining indefinitely the vibration, said resonance frequency being a function of the force which acts on said mass and from which, together with other constants of the circuits, the force acting upon said mass can be determined.

2. A force measuring device comprising, in combination, a mass which is suspended by a wire of non magnetic material having a high ratio of tensile strength to density, means for producing a magnetic field at right angles to said wire, a vacuum tube amplifier having a pair of output terminals and a pair of input terminals, said wire being connected across said output terminals, a coil located near the center of said wire, having its plane longitudinally disposed relative to said wire, said coil being connected across the input terminals of said amplifier, said wire when plucked being effective to induce a voltage in said coil and the input terminal of the amplifier which voltage has a frequency which is the same as the natural resonance frequency of said wire, said vacuum tube amplifier being effective to amplify this voltage and feed it back to said wire, thereby acting, in effect, as a vacuum tube oscillator and sustaining indefinitely the vibration, said resonance frequency being a function of the force which acts on said mass and from which, together with other constants of the circuits, the force acting upon said mass can be determined from the formula $$f_n = \frac{1}{2L}\sqrt{\frac{Mg}{p}}$$

wherein $f_n$ is the resonance frequency, L is the length of wire, M is the mass, $g$ is the acceleration of gravity and $p$ is the mass per unit length of the wire.

3. Apparatus as set forth in claim 1 in which said wire is made of tungsten.

4. Apparatus as set forth in claim 1 in which said wire is made of quartz fibers sputtered with gold.

SIDNEY SIEGEL.